United States Patent
Hwang et al.

(10) Patent No.: US 9,437,964 B2
(45) Date of Patent: Sep. 6, 2016

(54) RF COAXIAL CABLE CONNECTOR WITH RETENTION MEMBER

(71) Applicant: FOXCONN INTERCONNECT TECHNOLOGY LIMITED, Grand Cayman (KY)

(72) Inventors: Tzu-Yao Hwang, New Taipei (TW); Lung-Sheng Tai, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/804,514

(22) Filed: Jul. 21, 2015

(65) Prior Publication Data

US 2016/0020535 A1 Jan. 21, 2016

(30) Foreign Application Priority Data

Jul. 21, 2014 (TW) .............................. 103213007 U

(51) Int. Cl.
*H01R 13/58* (2006.01)
*H01R 12/77* (2011.01)
*H02G 15/007* (2006.01)

(52) U.S. Cl.
CPC ........ *H01R 13/5812* (2013.01); *H01R 12/778* (2013.01); *H02G 15/007* (2013.01); *H01R 2201/02* (2013.01)

(58) Field of Classification Search
CPC .......... H01R 23/7068; H01R 13/5812; H01R 9/0515; H01R 12/778
See application file for complete search history.

(56) References Cited

U.S. PATENT DOCUMENTS

| | | | | |
|---|---|---|---|---|
| 5,281,762 A * | 1/1994 | Long | ................... | H01R 9/0515 174/117 F |
| 5,824,955 A * | 10/1998 | Saiso | ................... | H01R 12/778 174/88 R |
| 6,312,281 B1 * | 11/2001 | Rodriguez | ........... | H01R 9/0509 439/394 |
| 7,704,077 B1 * | 4/2010 | Morley | ................... | H01R 24/50 439/63 |
| 9,203,184 B1 * | 12/2015 | Hui | ...................... | H01R 13/629 |
| 2006/0025000 A1 * | 2/2006 | Reker | ................... | H01R 13/562 439/281 |
| 2013/0040482 A1 * | 2/2013 | Ngo | .................... | H01R 12/7023 439/328 |
| 2013/0040483 A1 * | 2/2013 | Ngo | .................... | H01R 12/7023 439/328 |
| 2013/0163261 A1 * | 6/2013 | Shimoji | ................ | H01R 31/06 362/382 |
| 2015/0044913 A1 * | 2/2015 | Chen | .................... | H01R 12/716 439/676 |
| 2015/0111410 A1 * | 4/2015 | Gingrich, III | ....... | H01R 12/771 439/358 |
| 2015/0244090 A1 * | 8/2015 | Mostoller | .......... | H01R 12/7047 439/81 |
| 2015/0280337 A1 * | 10/2015 | Chawla | ................. | H01R 12/88 439/59 |
| 2016/0020535 A1 * | 1/2016 | Hwang | ................ | H02G 15/007 439/62 |

\* cited by examiner

*Primary Examiner* — James Harvey
(74) *Attorney, Agent, or Firm* — Wei Te Chung; Ming Chieh Chang

(57) ABSTRACT

An electrical connector assembly is adapted for electrical connecting and retained on a wireless module with a receptacle RF connector mounted on an end of the wireless module is provided. The assembly includes a coaxial cable connector including a connector end and a coaxial cable extending from the connector end and a retention member including a main base and a retention cavity in front of the main base, the main base defining a corresponding cable receiving groove through a front end and a rear end of the main base. The retention cavity further defines a projecting portion elastically pressing against a surface of the end of the wireless module when the end of the wireless module, the receptacle RF connector and the connector end of the coaxial cable connector are receiving in the retention cavity and the coaxial cable go through the cable receiving groove.

20 Claims, 7 Drawing Sheets

RF COAXIAL CABLE CONNECTOR WITH RETENTION MEMBER

BACKGROUND OF THE INVENTION

1. Field of the invention

The present invention relates to a RF (Radio Frequency) coaxial cable connector, and more particularly to a RF coaxial cable connector mating with a receptacle RF connector mounted on a wireless module.

2. Description of Related Art

One type connectors are used between a wireless module/card and antenna, which are named as RF connectors for the very thin computing platform, for example; Notebook, Tablet/Slate platforms. The receptacle RF connector mounted on one edge of the module has a 2×2 mm size, the cable coaxial connector electrically connecting to the antenna with a coaxial connector is intended to mating with the receptacle RF connector. As known, the RF connectors require a much smaller solution, especially a mating height becomes to 1.45 mm. The retention force between the receptacle RF connector and the coaxial cable connector is so week that a disconnection may be occur.

In view of the above, an improved cable connector assembly is desired to overcome the problems mentioned above.

SUMMARY OF THE INVENTION

An object of the present invention is to provide a retention member to retained a RF coaxial connector to a wireless module.

In order to achieve above-mentioned object, an electrical connector assembly adapted for electrical connecting and retained on a wireless module with a receptacle RF connector mounted on an end of the wireless module is provided. The electrical connector assembly comprises a coaxial cable connector comprising a connector end intending to mate with the receptacle RF connector and a coaxial cable extending from the connector end and a retention member comprising a main base and a retention cavity in front of the main base, the main base defining a corresponding cable receiving groove through a front end and a rear end of the main base. The retention cavity further defines a projecting portion elastically pressing against a surface of the end of the wireless module when the end of the wireless module, the receptacle RF connector and the connector end of the coaxial cable connector are receiving in the retention cavity and the coaxial cable go through the cable receiving groove.

Other objects, advantages and novel features of the present invention will become more apparent from the following detailed description of the present embodiment when taken in conjunction with the accompanying drawings.

DETAILED DESCRIPTION OF THE INVENTION

The present invention will be discussed hereafter in detail in terms of the embodiments of the present invention. However, any well-known structure or feature is not shown in detail in order to avoid unnecessary obscurity of the present invention.

Figure 1:
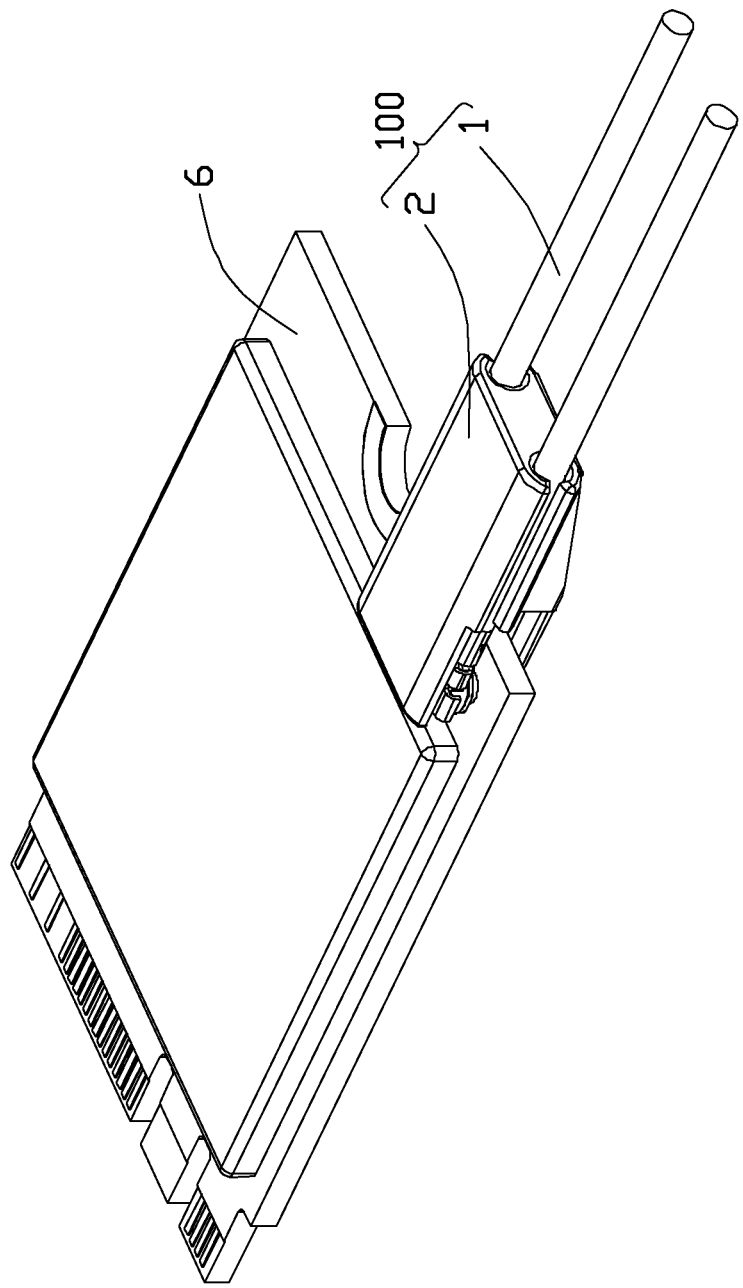
FIG. 1 is an assembled perspective view of an electrical connector assembly in accordance with a preferred embodiment of the present invention.
Figure 2:
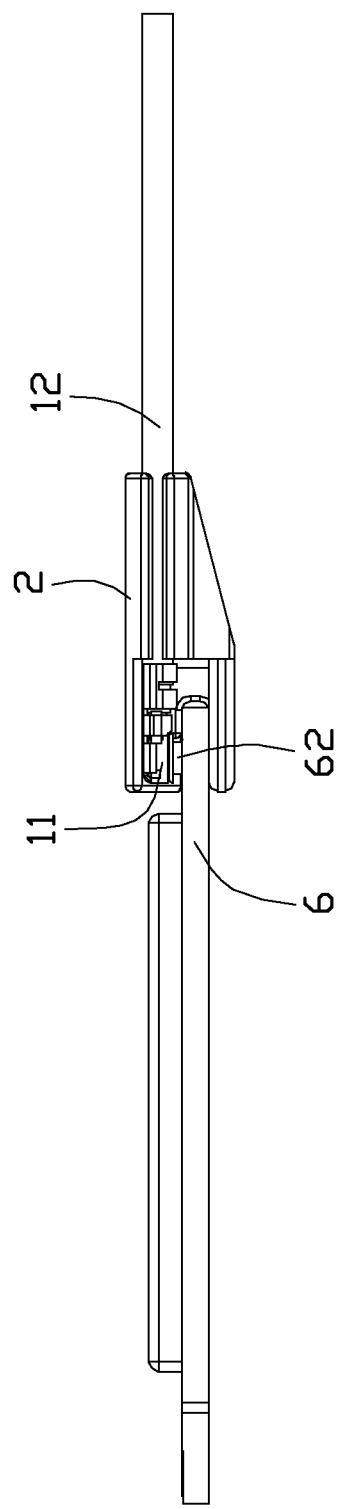
FIG. 2 is a side view of the electrical connector assembly of FIG. 1.
Figure 3:
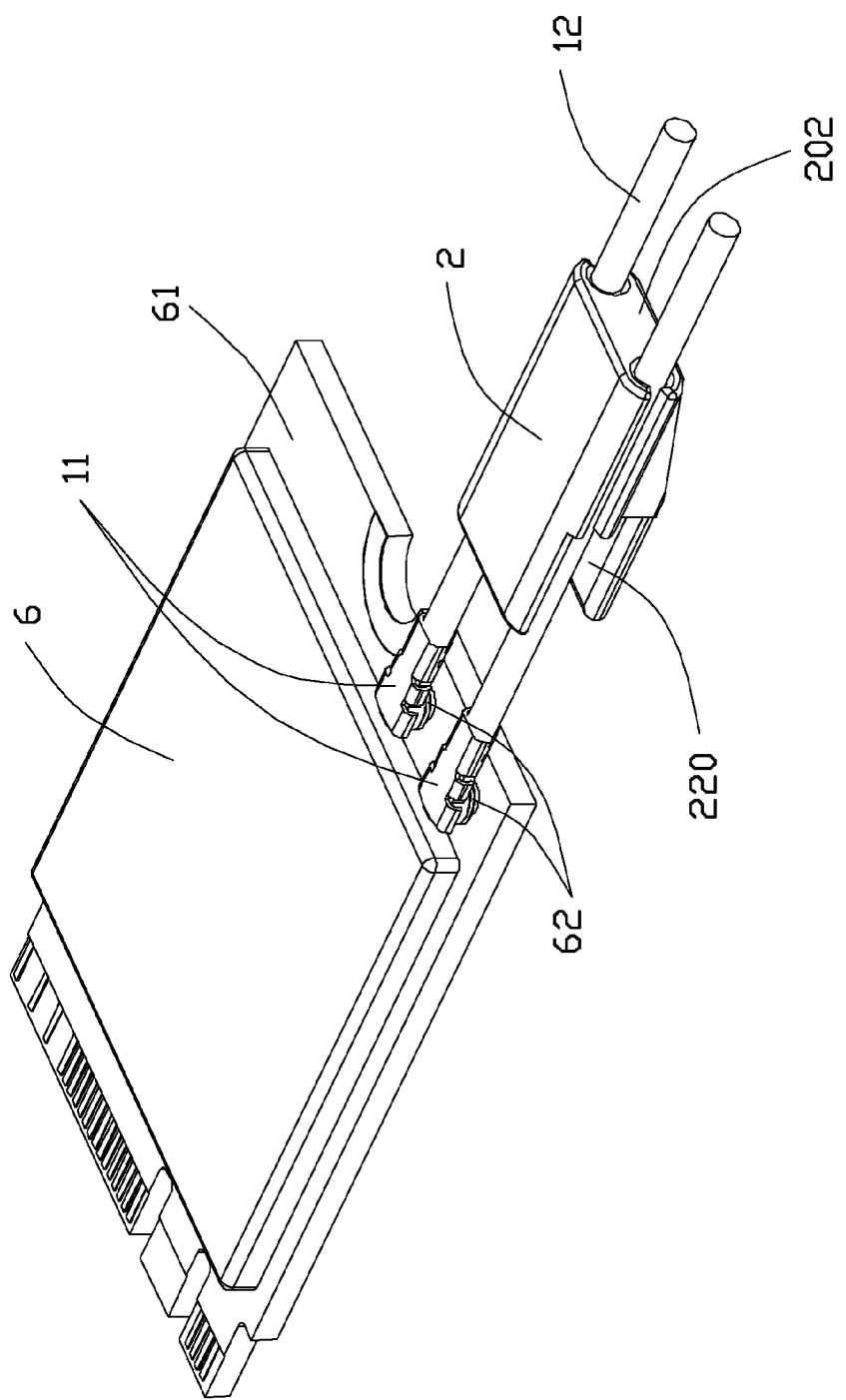
FIG. 3 is a perspective view of the electrical connector assembly during the retention member is assembling process.

Referring to FIGS. 1 through 3, a preferred embodiment of the present invention illustrates a wireless module 6, for example M. 2 module with a smaller form factor used for Mobile Add-In cards, a receptacle RF connector 62 mounted on an end 61 of the printed circuit board of the module 6 and an electrical connector assembly 100. The electrical connector assembly 100 comprises a coaxial cable connector 1 and a retention member 2 which is used for preventing the cable connector 1 disconnecting from the receptacle RF connector 62. The cable connector 1 includes a connector end 11 mating with the receptacle connector 62 and a coaxial cable 12 extending from the connector end 11. In the preferred embodiment, two receptacle connectors 61 are disposed on a left side of the end 61 of the wireless module 6. In other embodiment, two other RF receptacle connector are added to the right side of the end of the module 6, and another retention member 2 can be used. The retention member 2 is used for retaining the two cable connectors 11 at the same time.

Figure 4:
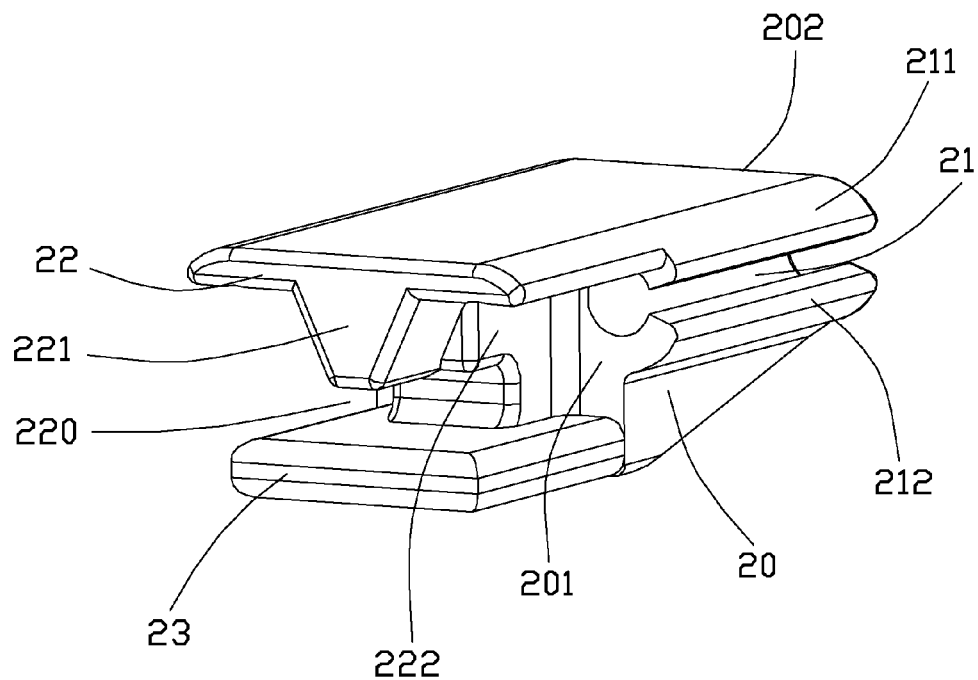
FIG. 4 is a top and front perspective view of the retention member.
Figure 5:
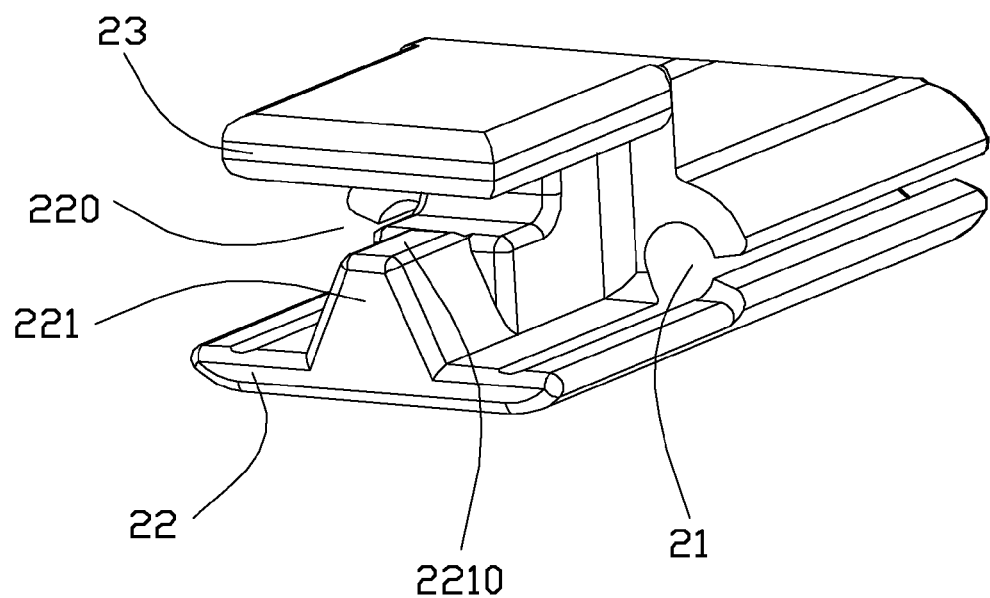
FIG. 5 is a bottom and front perspective view of the retention member.
Figure 6:
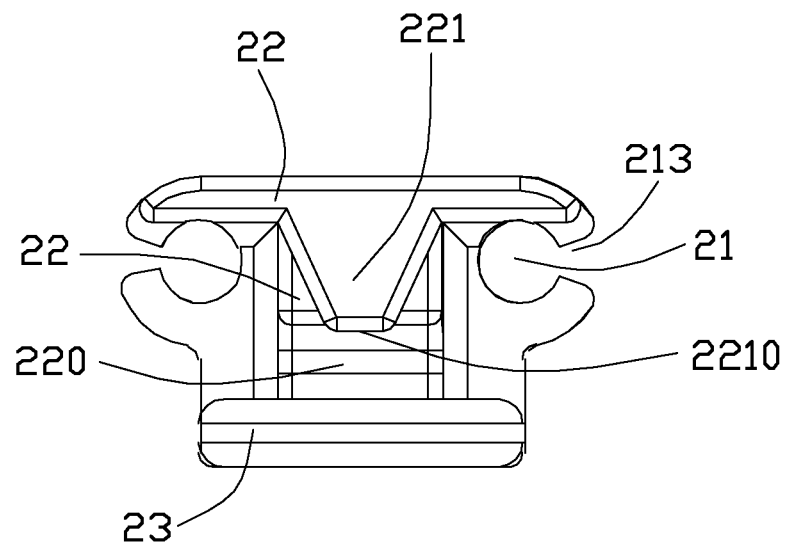
FIG. 6 is a front view of the retention member.
Figure 7:
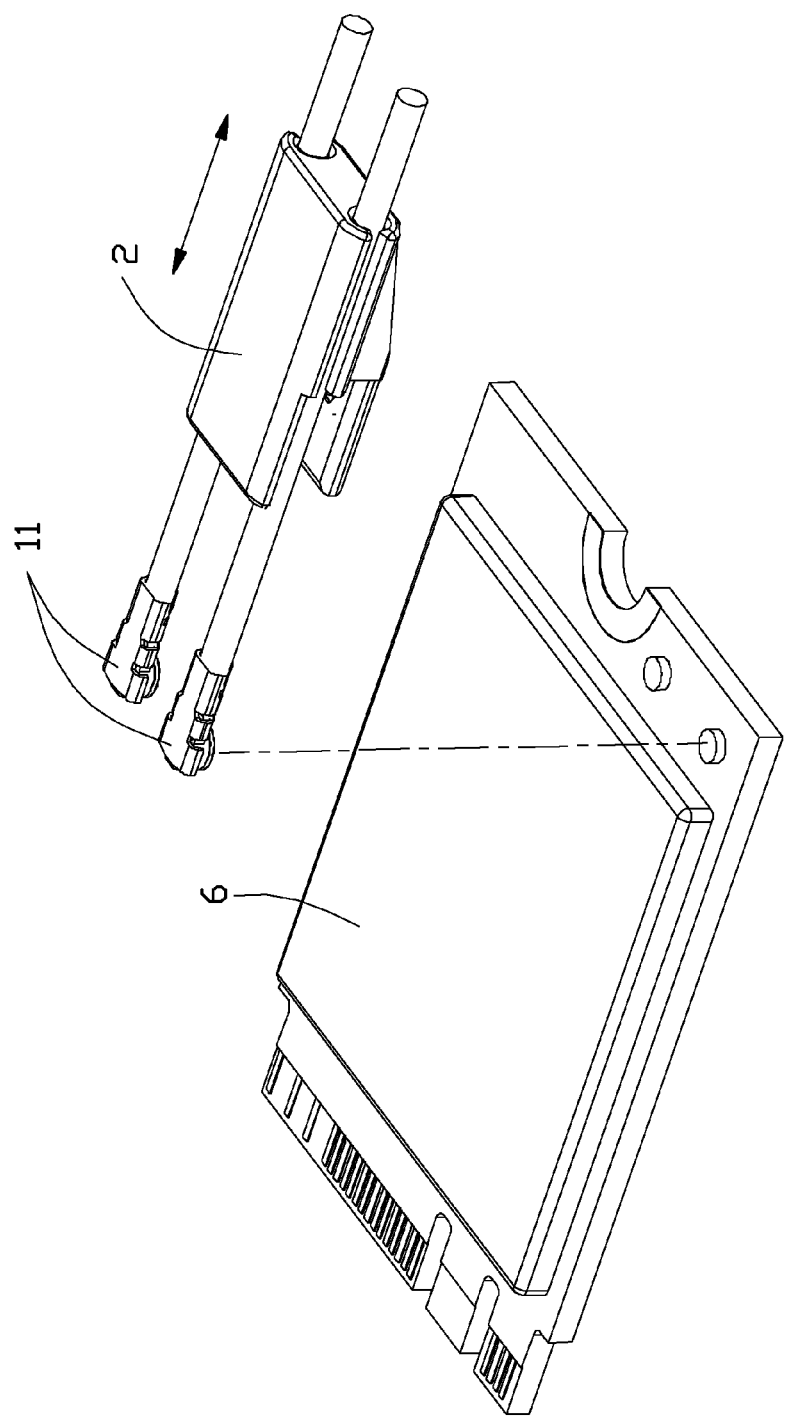
FIG. 7 is a perspective view of the electrical connector assembly during the retention member is assembling process.

Referring to FIGS. 4 through 6, the retention member 2 comprises a main base 20 defining a front end 201 and a rear end (not labeled) and a retention cavity 220 in front of the main base 20. The main base 20 member defines two cable receiving grooves 21 at lateral sides thereof and running through the front end 201 and the rear end thereof, which are intended for slidingly receiving the coaxial cables 12. Each cable receiving groove 21 is constructed with an upper eaves 211 and a lower eaves 212 laterally extending from the main base 20 and separated from each other with a slot 213. The slot 213 is smaller than a diameter of the cable 12, thereby providing a flexibly assembly of the coaxial cables 12. The upper eaves 211 and lower eaves 212 have smooth and arc inner surface and outer surface as best shown in FIG. 6.

The retention member 2 further comprises an upper board/plate 22 and a lower board/plate 23 extending forwards from the front end 201 of the main base 20, respectively, thereby defining said retention cavity 220 between the upper and lower boards. A projecting portion 221 projects from a lower surface of the upper board 22 to the retention cavity 220 and a raised portion 222 projects in the retention cavity. The raised portion 222 is integrated with the main base 20 without any elasticity in a vertical direction perpendicular to the upper and lower boards and disposed between the main base 20 and the projecting portion 221. The projecting portion 221 has a smaller elasticity so that the projecting portion can press against the wireless module 6. As best shown in FIG. 6, the lower surface 2210 of the projecting portion 221 is lower than that of the raised portion 222. That is, the dimension between the raised portion 222 and the lower board 23 is equal to that of the module 6, the dimension of a gap (not labeled) between the projecting portion 221 and the lower board 23 is equal to or somewhat smaller than a thickness of the module 6. Therefore, the projecting portion 221 may provide a retention force to the module 6

After assembled, the end edge 61 of the wireless module 6, the receptacle RF connectors 62 and the connector ends 11 of the coaxial cable connectors are received in the retention cavity 220 and the coaxial cables 12 go through the cable receiving groove 21, wherein an outer edge of the end of the wireless module 6 is fitly clipped between the raised portion 222 and the lower board 23 without any elasticity, the inner edge of the end of the module 6 between the two receptacle RF connectors 62 is pressed by the projecting portion 221 with a smaller elasticity, the connector end 11 are receiving in the retention cavity 220 and fitly stay the upper board, thus preventing the connector ends from rotation. Notably, in this embodiment the retention member 2 is not moved relative to the RF coaxial cable connector in the axial direction by means of interference fit among the wireless module 6, the coaxial cable connector and the retention member 6. Anyhow, alternately an interference fit retention may be provided between the retention member 6 and the coaxial cable connector only so as to prevent incautious removal of the retention member 6 from the coaxial cable connector in the axial direction, thus also assuring mating between the coaxial cable connector the receptacle connector.

One assembly method is provided thereinafter. The retention member 2 is provided with two cable receiving grooves 21, one RF coaxial cable connector is pre-assembled on the retention member 2. The connector end 11 is received in the retention cavity 220 and the cable 12 goes through one cable receiving groove 21. When the assembly is mating with the wireless module 6, another coaxial cable can be assembled in another groove through the slot 213.

However, the disclosure is illustrative only, changes may be made in detail, especially in matter of shape, size, and arrangement of parts within the principles of the invention.

What is claimed is:

1. An electrical connector assembly adapted for electrical connecting and retained on a wireless module with a receptacle RF (Radio Frequency) connector mounted on an end of the wireless module, comprising:
    a coaxial cable connector comprising a connector end intending to mate with the receptacle RF connector and a coaxial cable extending from the connector end; and
    a retention member comprising a main base and a retention cavity in front of the main base, the main base defining a corresponding cable receiving groove through a front end and a rear end of the main base;
    wherein the retention cavity further defines a projecting portion elastically pressing against a surface of the end of the wireless module when the end of the wireless module, the receptacle RF connector and the connector end of the coaxial cable connector are receiving in the retention cavity and the coaxial cable go through the cable receiving groove.

2. The electrical connector assembly as described in claim 1, wherein the cable receiving grooves is constructed with an upper eaves and lower eaves separated from each other.

3. The electrical connector assembly as described in claim 1, wherein the retention member further defines a raised portion between the main base and the projecting portion, the raised portion is integrated with the main base without any elasticity in a condition that an outer edge of the end of the wireless module is retained between the raised portion and an inner edge of the end of the wireless module is pressed by the projecting portion with a smaller elasticity.

4. The electrical connector assembly as described in claim 1, wherein the retention member defines two cable receiving grooves at opposite lateral sides of the main base, the two cable receiving grooves receiving two coaxial cables of two coaxial cable connectors, respectively.

5. A RF (Radio Frequency) coaxial cable connector assembly comprising: a cable connector comprising a RF connector end and a coaxial cable extending from the RF connector end; and a retention member comprising a main base, and an upper board and a lower board extending from the main base and defining a retention cavity between the upper board and the lower board; wherein the main base defines two cable receiving grooves at opposite lateral sides thereof, a projecting portion and a raised portion extending in the retention cavity and disposed between the two cable receiving grooves in a lateral direction respectively; wherein the RF connector end is received in the retention cavity and fitly stays with the upper board, the coaxial cable goes through one of the cable receiving grooves.

6. The RF coaxial cable connector assembly as claimed in claim 5, wherein another cable receiving grooves is constructed by an upper eaves and a lower eaves separated from each other with a slot.

7. The RF coaxial cable connector assembly as claimed in claim 5, wherein the projecting portion has a small elasticity in a vertical direction and the raised portion has no elasticity in the vertical direction.

8. An electrical connector assembly for use with a wireless module having a printed circuit board with a RF (Radio Frequency) receptacle connector mounted upon an upper surface thereon, comprising:
    a RF plug connector including a lower cylindrical mating part defining a downward mating port in a vertical direction, and an upper connecting part defining a horizontally extending connecting port along a front-to-back direction;
    a cable connected to the connecting port and extending rearwardly along said front-to-back direction;
    a retention member mounted upon the cable and moveable along the front-to-back direction, said retention member defining a lower plate to upwardly intimately confront a bottom surface of the printed circuit board in the vertical direction, and an upper plate to downwardly intimately confront an upper face of the connecting part when the RF plug connector is mated with the RF receptacle connector with the retention member being moved to the front end of the upper connecting part.

9. The electrical connector assembly as claimed in claim 8, wherein said lower plate and said upper plate are aligned with each other in an opposite manner in said vertical direction.

10. The electrical connector assembly as claimed in claim 8, wherein a retention cavity is formed between the upper plate and the lower plate in said vertical direction, and a dimension of the retention cavity in said vertical direction is essentially equal to a combination of a thickness of the printed circuit board and a height of the mated RF plug and receptacle connectors.

11. The electrical connector as claimed in claim 10, wherein said retention member includes a main base behind the retention cavity in the front-to-back direction, and a receiving groove extends through the main base to receive the cable therein.

12. The electrical connector as claimed in claim 11, wherein said receiving groove is outwardly open to an exterior in a lateral direction perpendicular to both said front-to-back direction and said vertical direction for installation of the cable thereinto.

13. The electrical connector as claimed in claim 11, wherein the main base forms an inclined lower face to comply with the lower plate in a front region and an end of the receiving groove in a rear region.

14. The electrical connector assembly as claimed in claim 10, wherein the upper plate is equipped with an inward projection portion opposite to the lower plate, and a gap formed between the projection portion and the lower plate is close to a thickness of the printed circuit board.

15. The electrical connector assembly as claimed in claim 14, wherein a dimension of the gap in the vertical direction is less than one half of that of the retention cavity in the vertical direction.

16. The electrical connector assembly as claimed in claim 10, wherein said retention cavity is exposed to an exterior in a lateral direction perpendicular to both said front-to-back direction and said vertical direction.

17. The electrical connector assembly as claimed in claim 8, wherein said retention member defines a retention cavity with a dimension, in a lateral direction perpendicular to both said front-to-back direction and said vertical direction, to receive a pair of plug connectors and the associated two cables.

18. The electrical connector assembly as claimed in claim 17, wherein the retention member includes a projection portion to separate the retention cavity into two sub-cavities to receive the two plug connectors, respectively.

19. The electrical connector as claimed in claim 8, wherein a thickness of the retention member in the vertical direction is larger than that of the wireless module in the vertical direction.

20. The electrical connector as claimed in claim 8, wherein the RF receptacle connector is mounted upon an edge region of the printed circuit board, and when the receptacle connector and the plug connected are mated with each other, the cable extends beside and beyond the wireless module.

* * * * *